July 17, 1951 C. R. SACCHINI 2,560,780
SURFACE WIPING MECHANISM
Filed Nov. 9, 1944 4 Sheets-Sheet 1
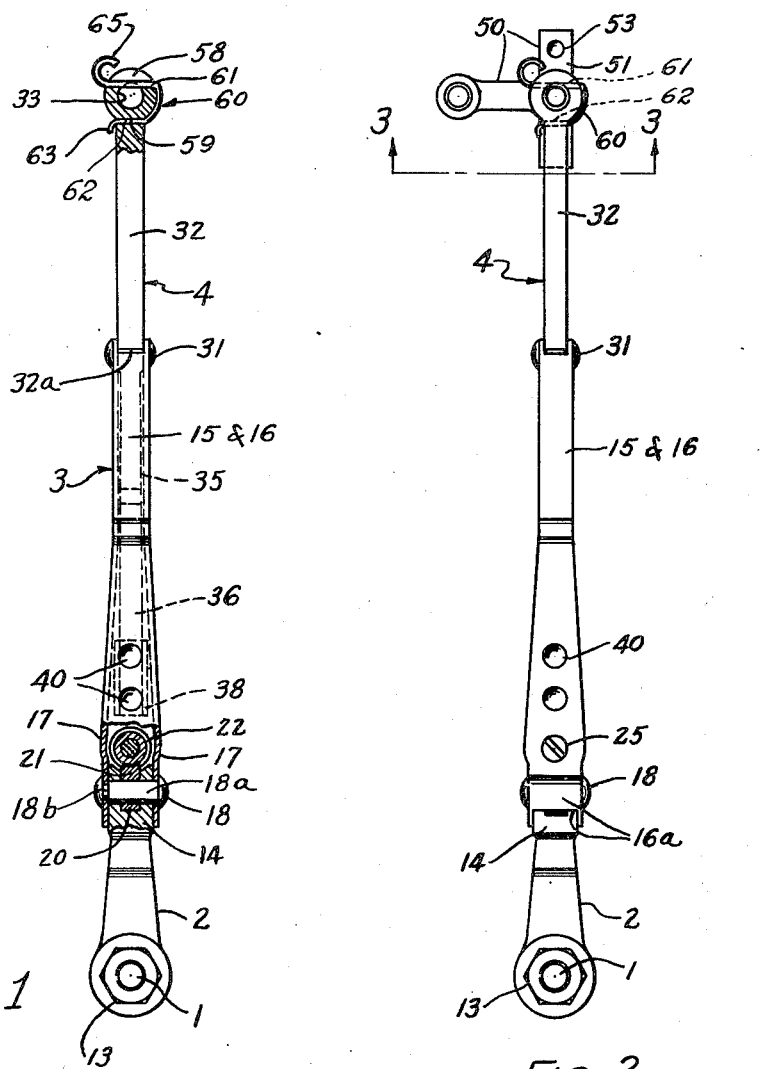
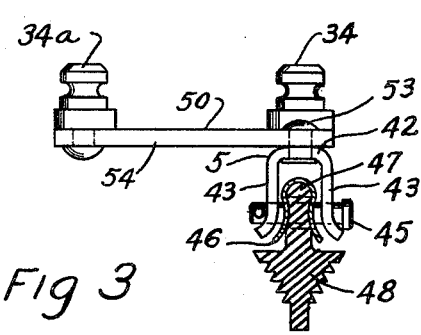
INVENTOR.
COLUMBUS R. SACCHINI
BY George M Soule
ATTORNEY July 17, 1951  C. R. SACCHINI  2,560,780
SURFACE WIPING MECHANISM
Filed Nov. 9, 1944  4 Sheets-Sheet 2
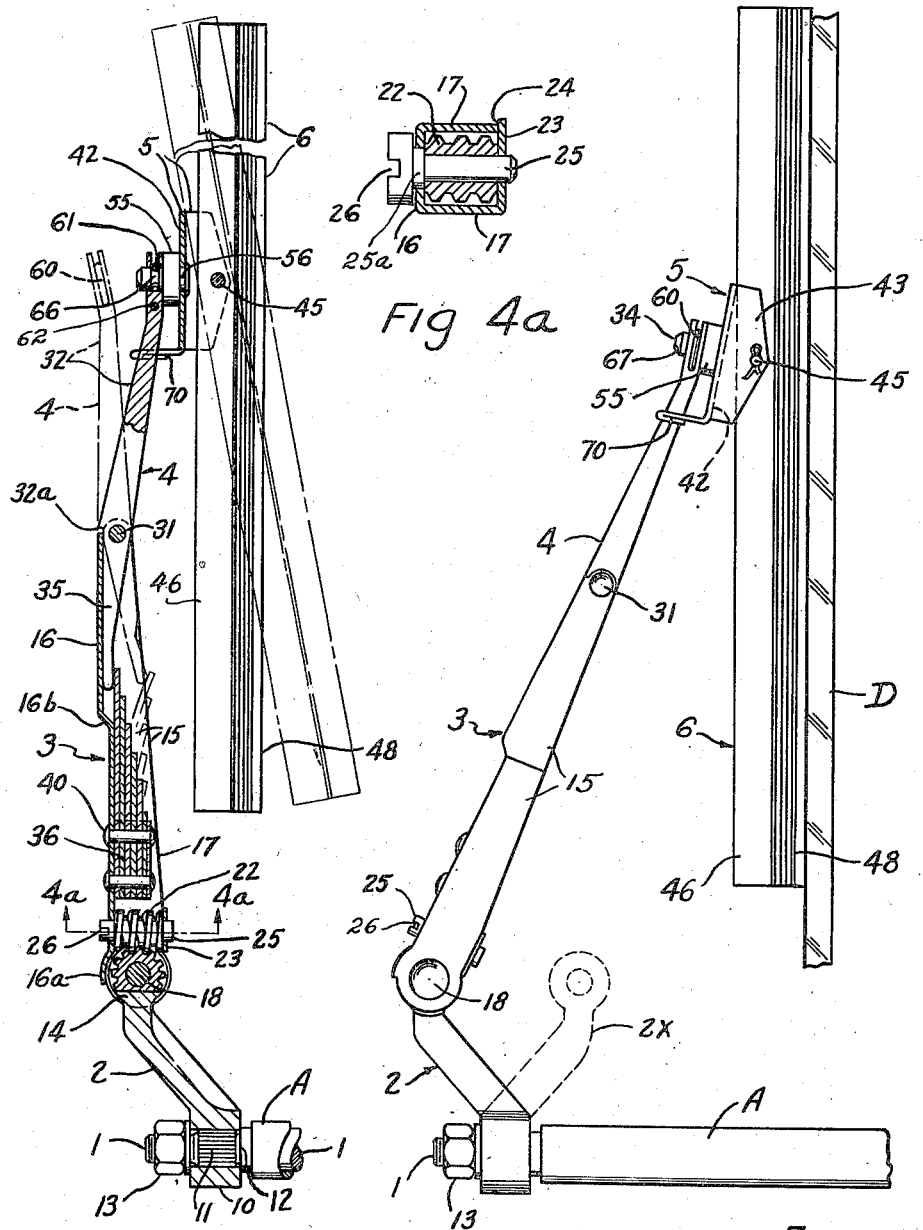
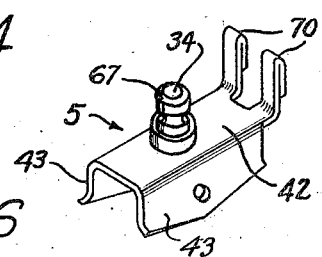
INVENTOR.
COLUMBUS R. SACCHINI
BY George M. Soule
ATTORNEY

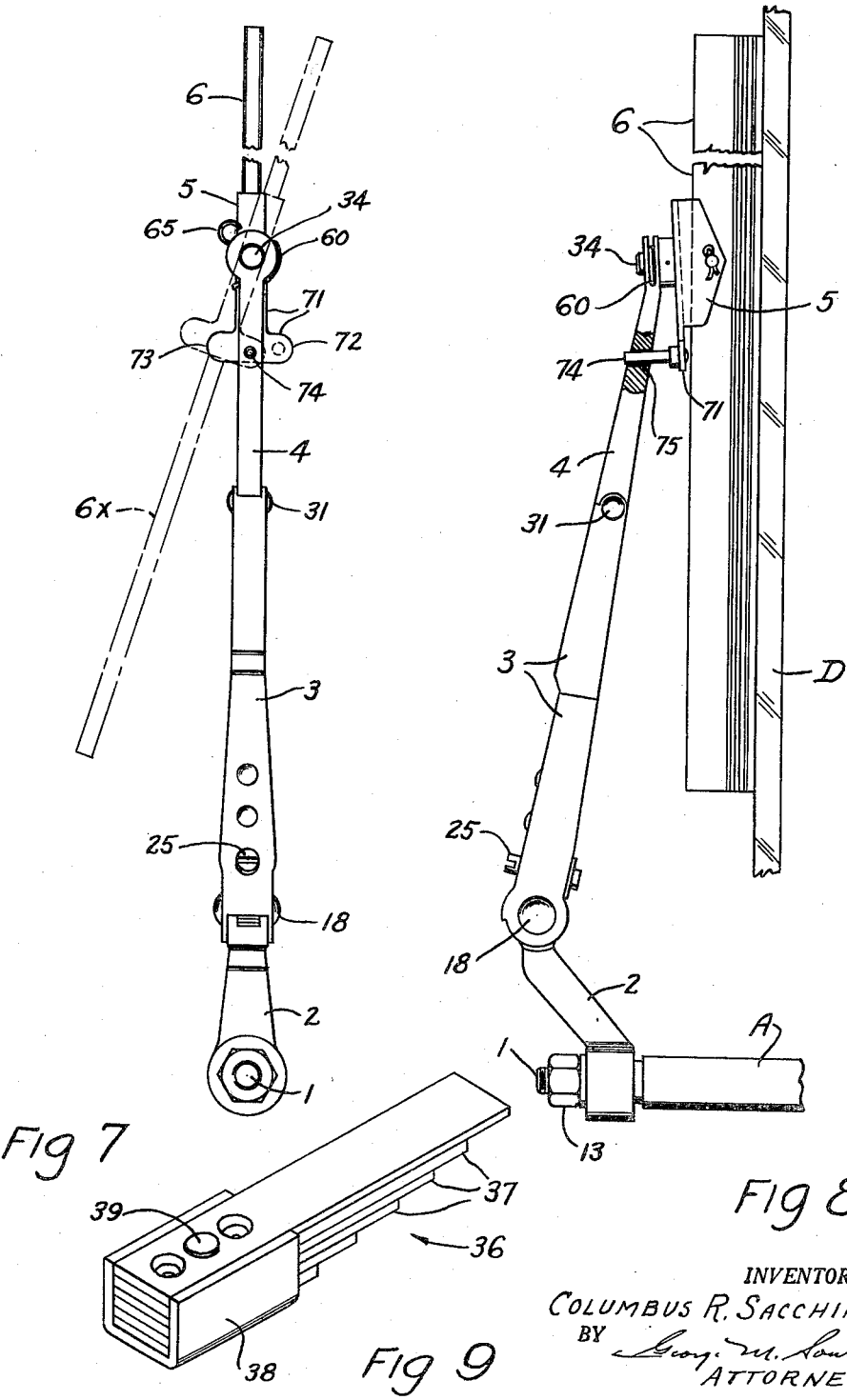

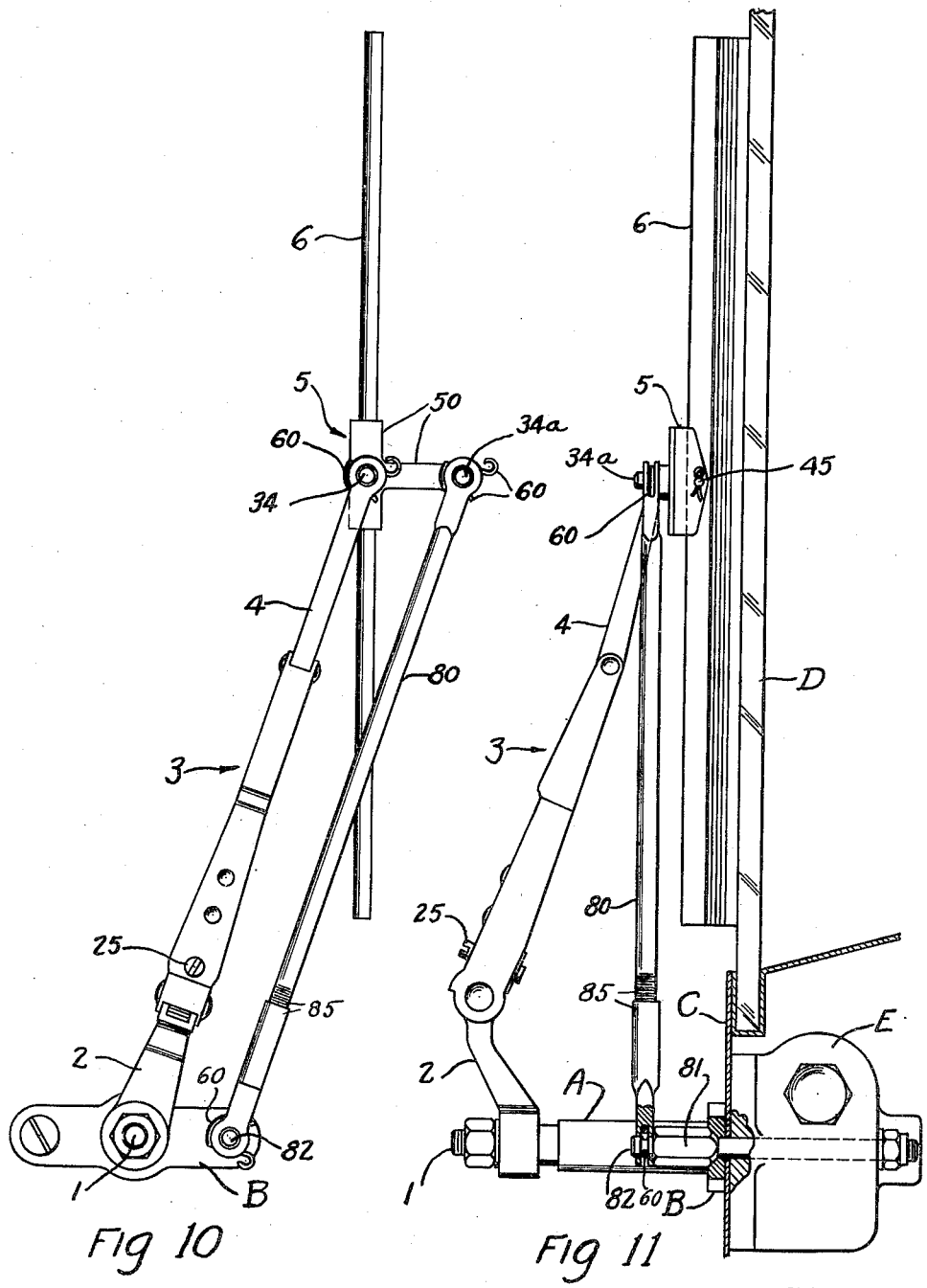

Patented July 17, 1951

2,560,780

UNITED STATES PATENT OFFICE 2,560,780

SURFACE WIPING MECHANISM

Columbus R. Sacchini, Willoughby, Ohio, assignor to The Marquette Metal Products Company, Cleveland, Ohio, a corporation of Ohio Application November 9, 1944, Serial No. 562,603

8 Claims. (Cl. 15—255)

The primary object of this invention is to provide an improved drive arm or drive arm assembly for surface wiping elements, such as squeegee blades, scrapers and applicators. The particular embodiments of the invention illustrated herewith, and as described, are preferred forms for use on windshields and other window portions of aircraft. The essential novel principles are, of course, applicable to surface wiping generally on vehicles and other equipment.

A specific object is to provide a wiper drive arm having a practicable and adjustable means for securing higher blade pressures than are obtainable by present-day wiper equipment.

A further object is to provide a drive arm mechanism or assembly substantially a single form of which is adapted for practical application to greatly varying designs of windshield and window surface and frame constructions and varying dispositions of arm driving means incident to or required by such variation in design.

Another specific object is to provide a wiper drive arm assembly adapted to serve in wiper installations presenting radical variation either in total required arm length or in the matter of required distance from the point of support to the plane of the surface to be wiped, or both, wherein said requirement variations are met, so far as installation is concerned, by supplying an appropriate one of a series of mounting head sections which need to differ from each other only in length, being otherwise substantially alike in design.

A further object is to provide a drive arm mechanism in which blade and glass contact at desired regulatable blade pressures may be obtained regardless of the distance, within practicable limits, between the mounting head connection of the mechanism with the drive shaft and the principal plane of the glass or surface to be wiped.

Another object is to provide a simple wiper drive arm assembly including spring means operable at a greater mechanical advantage than is ordinarily possible and arranged for enabling a considerable amount of adjustment of blade pressure on the surface to be wiped.

A still further object is to provide an improved mounting means for a leaf spring assembly in a wiper drive arm.

A further object is to provide a wiper drive arm assembly having an improved pivotal connecting means for effecting and positively maintaining angular adjustment of one element of the assembly with reference to an adjacent element.

Another object is to provide a wiper drive arm assembly having a mounting or head section in the form of a bent arm carrying one part of an adjusting pivot means for an adjacent arm section, which mounting or head section has two operatively equivalent but relatively reversed positions with respect to the adjacent section whereby to change the plane of operation of the latter.

Other objects include provision of an improved readily detachable connection between the wiper drive arm and a wiper element such as a squeegee or scraper, and several improvements in blade supporting saddles.

A further object is to provide a readily detachable pivot connection applicable to whatever pivotally connected members of a wiper installation may require disconnection from each other for servicing or other purposes.

Other novel features of the invention will become apparent from the following description of said preferred or illustrative embodiments.

In the drawings, Fig. 1 is a front view of the drive arm assembly in one form, partly broken away or in section;

Fig. 2 is a similar but entirely elevational view with a blade supporting saddle part added;

Fig. 3 is a sectional view as indicated by the line 3—3 of Fig. 2, showing the saddle and a typical blade construction pivotally secured thereto;

Fig. 4 is a central longitudinal sectional view of the drive arm arrangement according to Fig. 1, the view showing, partly diagrammatically, portions of the assembly in illustrative adjusted positions;

Fig. 4a is a transverse detail sectional view taken at 4a—4a on Fig. 4;

Fig. 5 is a side elevation of the drive arm assembly, showing the parts in still differently adjusted relative position;

Fig. 6 is a perspective view of one form of blade supporting saddle;

Fig. 7 is a view similar to Fig. 2, showing a modified saddle arrangement;

Fig. 8 is a side elevation of the assembly according to Fig. 7;

Fig. 9 is a perspective view showing a cartridge spring assembly;

Fig. 10 is a front view showing the drive arm assembly hereof with a parallelograph type of blade guiding mechanism; and Fig. 11 is a side elevation of the mechanism shown by Fig. 10, partly in section.

The parts shown in most of the assembly views are: drive shaft 1, mounting head 2, pressure adjustment arm or assembly 3, adjustment arm extension 4, saddle 5, and wiper blade or blade assembly 6.

In Fig. 11 a typical support for the drive shaft 1 is shown in the form of a bushing A of a mounting bracket B attached to the forward face of framework, partially shown at C, and which supports the window panel D. A drive unit E of appropriate character for driving the shaft 1 is secured to the framework partly by the mounting bracket. The drive unit and shaft will be assumed to be associated with the lower portion of the window framework as a typical position for the driving and supporting parts of the drive arm mechanism hereof.

As shown by Fig. 4, the arm section referred to as the mounting head 2 is shown in the form of a bent arm having an enlarged circular portion 10 which may, for example, be apertured complementary to a splined end portion 11 on the forward end of the drive shaft. The enlarged portion 10, as shown, seats against a shoulder 12 on the shaft, and beyond the splined portion the shaft carries a suitable fastener, such as an "Elastic Stop Nut" 13 shown bearing against the mounting portion 10 through the intermediary of a suitable washer. The principal part of the pressure adjustment arm assembly 3 is a body 15 formed as a channel and constituted by a web 16 and substantially identical parallel flanges 17.

As shown best by Figs. 1 and 4, a slightly enlarged generally circular end portion 14 of the mounting head extends snugly into a partial housing therefor formed by end portions of the web and flange of the pressure adjustment arm body 15. The mutually overlapping portions of the mounting head and body 15 are pivotally secured together by a pin 18 preferably in the form of a rivet, the main cylindrical shank portion 18a of which is of a length slightly greater than the combined width of the end portion 14 of the mounting head and one flange 17. The rivet shank portion 18a abuts the other flange 17 as a shoulder so that, when a reduced diameter portion 18b of the rivet is headed over as by a spinning operation against the opposite, outer, side of said other flange, the rivet cannot bind the connected parts.

The generally circular terminal portion 14 of the mounting head has an end slot with parallel sides and a flat bottom 20. The slot snugly receives a worm wheel segment 21 held in place by the rivet shank 18a which passes through the segment and thus holds the mutilated face of the segment in contact with the bottom face 20 of the slot so that the worm wheel segment cannot turn.

Cooperating with the worm wheel segment and adjustably carried by the pressure adjustment arm body 15 is a worm 22 having fairly low-pitch (self locking) threads in mesh with the teeth of the worm wheel segment. The worm 22, as shown in Figs. 4 and 4a, is mounted partly by the web 16 of the adjustment arm body and partly by a bridge portion 23 of said body extending parallel with the web 16 and connecting the rearwardly disposed portions or edges of the flanges 17. The connecting bridge 23 may be conveniently made as an extension of one of the flanges 17, bent therefrom at 90°, and with its end secured as by welding to the other flange at 24. The web 16 and bridge 23 have aligned apertures to receive the worm axle.

The bridge 23 can also be made as a separate piece secured as by welding to respective flanges 17 of the body 15, in which event the worm and its axle may comprise a simple one piece screw machine part put into place before the welding is effected.

In the preferred construction, illustrated by Fig. 4a, the worm 22 and axle 25 are made separately from each other and mounted by an assembly operation after the welding, as at 24, has been effected to complete the shell body 15. The worm as shown is axially bored to receive the reduced cylindrical portion of the axle with a press fit, or equivalent shrink fit, so that the worm cannot turn on the axle. Adjacent the reduced portion of the axle is a cylindrical shoulder 25a beyond which the axle is further enlarged to form a head for engagement by a suitable tool for rotary adjustment of the worm. As shown the head is slotted at 26 for engagement by a screw driver. Operation of such screw driver, obviously, swings the arm 4 about the pivot 18 on the mounting head. The shoulder 25a and the end of the axle remote from the shoulder turn freely in the apertures of the web 16 and bridge 23 respectively. The increased bearing area afforded by enlargement of the axle at 25a for engagement with the bearing aperture of the web 16 is of considerable advantage in preventing eventual looseness of the axle in its bearings. The length of the shoulder 25a is slightly greater than the thickness of the web 16 so that when the axle is pressed into place the shoulder acts as a stop so that the web cannot be clamped between the slotted head and the worm. Thus if the worm is of slightly less length than the distance between the web 16 and bridge 23 the worm assembly cannot bind. The enlarged head for the slot 26 is of advantage in providing sufficient slot-supporting metal stock so that mutilation of the slot is not likely to occur. A simple pressed-in cylindrical pin in place of axle 25 and provided with the screw driver slot at the appropriate end would also serve to adjust the worm and prevent binding, but if such pin were made large enough properly to support the screw driver slot the wall of the worm would have to be too greatly reduced in thickness to afford the proper supporting strength for the worm threads. Such simple cylindrical pin (of uniform diameter from end to end) would also present difficulties in assembly because if there were no stop shoulder on the pin there would be no assurance that the pin would always be pressed into the bore of the worm the proper distance.

The amount of offset of the free end portion of the mounting head 2 from the point of shaft attachment of the mounting head in a direction perpendicular to the plane of swinging movement of the arm assembly (or in other words the effective angular bend in the mounting head) is such that, if the point of attachment happens to be very close to the plane of the glass or surface to be wiped, the end of the blade which projects toward the drive shaft will not interfere with any portion of the drive arm assembly. The effect of the offset in such case is to hold the pivotally supported end of the adjustment section 3 of the drive arm assembly the desired distance away from the plane of the glass. If the amount of offset is the same in all of the different length mounting heads which may be necessary for a full series in adapting the assembly for wiping surfaces as near to and as far from the point of attachment of the drive arm as could be required, then the number of parts constituting the series can be much less than if variation in offset and length is requisite through the series.

In wiper equipment heretofore found suitable for use on aircraft and employing leaf spring means for adjusting pressure of blade on glass the mounting head and drive arm member pivotally supported thereby have a normal operating relative position which in a given design cannot be altered materially without interfering with the obtaining of the desired degree or range of pressure adjustment. In the present arrangement, which also uses leaf spring means for yieldably holding the blade against the glass the mounting head and adjacent drive arm member carried directly thereon (adjusting section 3) have, by reason of the worm thread adjustment described above, a great variety of angular relative positions all of which are or may be considered normal positions in that, starting from those positions, the pressure of the blade on the glass can be made uniform in the various installations requiring such different angular relationships of mounting head and adjusting section in order to bring the wiper against the glass. The worm thread adjustment thus enables the different length mounting heads to be essentially similar in design, that is either to be straight or to have the same offset or angular bend.

A feature of the drive arm assembly hereof is that, in cases such as illustrated by Fig. 5, where the point of attachment for the mounting head is rather remote from the plane of the glass, the mounting head can be reversed or inverted as indicated by broken lines at 2x, Fig. 5, so that the drive arm assembly as a whole swings closer to the plane of the glass and minimizes forward projection on part of the wiper equipment.

The end marginal portion 16a, Fig. 4, of the web 16 of the adjustment arm body 15 extends in concealing relationship to the forwardly disposed worm wheel segment teeth so as to tend to prevent water and ice from coming into contact with the worm wheel teeth. The free edge of the web 16 forms a pivot-limiting abutment cooperating with a neck portion of the mounting head 2 adjacent the forked enlargement thereof (on one side or the other of the mounting head depending on how the latter is placed on the shaft, i. e. which side forward) so that the threads of the worm 22 cannot be damaged by attempted swinging of the body 15 too far away from the glass by means of turning the worm.

The supporting saddle 5 for the blade or blade assembly 6 is carried on the extension 4 of the adjustment arm assembly 3 as previously mentioned. The extension 4 is in the form of a nearly straight lever partly housed by the body 15 and pivoted thereto intermediately of the ends of the extension as on a shouldered rivet 31 similar to the rivet 18 in that the rivet is arranged so as not to bind the pivotally connected parts. One arm 32 of the extension lever 4 is apertured at 33 to form a bearing for a stud portion or pivot pin member 34 of the saddle 5. The stud may or may not turn in the bearing, depending upon the character and specific purpose of the installation. The opposite arm 35 of the lever 4 extends between the flanges 17 and is held against a forwardly offset portion 16a of the flange 16 by a spring assembly or unit 36 secured to the flange 16 of the body 15 and normally housed by the web and flanges thereof.

The spring assembly 36 (Figs. 4 and 9) preferably comprises a series of spring leaves 37 of equal width and length, or appropriately graduated length as desired, retained in a channel-shaped metal clip 38 as by a rivet 39 so as to constitute a self-contained or cartridge type spring sub-assembly. The rivet 39 may be omitted since the spring assembly is securely fastened to the web 16 of the body 15 as by a pair of rivets 40 passing through aligned openings in the web, spring leaves and clip 38. It is important that the leaves of the spring shall be free to slide on each other as the spring flexes, and when the rivets 40 are headed over, the flanges of the channel-shaped clip act as a distance piece to prevent the rivets from exerting sufficient pressure to bind the spring leaves. The front spring leaf overhangs a step at 16b in the flange 16 and extends therebeyond parallel with and in spaced relation to the offset portion 16a of the flange to afford reception space for the adjacent end portion 35 of the extension lever 4 without having to flex the spring out of normal position. Fig. 4 shows, in full lines, the normal position of the extension lever 4 and, in broken lines, the position of said lever with the spring fully flexed (maximum pressure position). In the latter position a shoulder 32a on the extension lever 4 abuts the outer end of the web 16 of the adjustment arm 15 to prevent the end portion 35 of the lever 4 from overstressing the spring or disengaging the spring by slipping past it. Ordinarily, the working position of the extension lever is between the two positions shown or indicated by Fig. 4, so that the blade or blade assembly can be lifted bodily out of contact with the glass at any time and without having to change the adjustment effected by the worm and worm gear segment as earlier described.

The saddle 5 in each of the forms shown comprises a channel shaped body stamping, the web 42 of which has the stud or pin 34 attached or secured rigidly thereto. The flanges or sides 43 of the stamping have aligned apertures to support a readily removable cross pin 45 passing through the sides of a channel-shaped blade holder 46 and a back fin or rib portion 47 of the wiper element 48 embraced by the flanges of the blade holder. The blade holder is loosely received between the flanges 43 which are flared as best shown in Fig. 3, and the cross pin 45 passes loosely through openings therefor in the blade holder and said fin portion 47 so that the blade can rock in the usual fashion for efficient squeegee action on the surface to be wiped. The blade holder is held by the cross pin 45 a sufficient distance away from the web 42 of the saddle body so that the blade assembly can pivot freely within the saddle as suggested in Fig. 4 by illustrative full line and broken line showings of the blade assembly.

The stud or pin 34 of the saddle in some cases constitutes a free pivotal support for the saddle and blade. In each case the stud or pin will operate as a pivot and is part of a readily detachable or releasable connection between the saddle and extension lever 4.

Three different types of blade supporting saddle are shown. In Figs. 2 and 3 the saddle 5 is of the type adapted to serve in an arrangement and assembly according to Figs. 10 and 11 or such arrangement as requires restrained or guided free pivotal motion of the blade in a plane parallel to the surface to be wiped. In Figs. 4, 5 and 6 the saddle is so arranged that the saddle and therefore the blade cannot pivot in such plane and the blade is maintained substantially in line with the drive arm assembly. In Figs. 7 and 8 free pivoting of the blade assembly and saddle in a plane parallel to the surface to be wiped is prevented and the saddle is arranged so that the blade may extend either in line with the drive arm assembly or, selectively, at various desired angles relative thereto as may be found desirable in order to "park" the blade parallel to the frame of the transparent panel wiped.

Referring further to Figs. 1, 2 and 3, the saddle attaching stud or pin 34 is secured to the saddle body at least partly through the intermediary of a bracket 50 of T-shape having a head portion 51 adapted to be secured to the web of the saddle forming channel as by rivets such as indicated at 53. An arm 54 of the T-shaped bracket carries a stud or pin 34a essentially similar to the saddle attaching stud or pin 34 for detachable connection with a guide rod of a parallelograph mechanism which will be described later in connection with Figs. 10 and 11. The pin or stud 34 of Figs. 2 and 3 may be carried in any suitable manner directly by the T-shaped bracket 50. For example, a shank portion of the stud or pin (cf. Fig. 4) may constitute a rivet as part of the means for securing the saddle body or bracket together.

The means for detachably mounting the saddle, through the intermediary of the attaching stud or pin 34, on the extension lever 4 is uniform in the various views. Attention is directed particularly to Figs. 1, 2, 4 and 5 for the detachable mounting feature.

The stud or pin 34 as shown (see Fig. 4) has a relatively enlarged cylindrical base 55 which lies adjacent the web 42 of the saddle body. A rearwardly extending reduced central portion 56 of the base constitutes a rivet by which the base is secured rigidly to the web 42. The forward face of the base bears against the rear flat side of the end portion of the arm 32 or the extension lever 4. The free end of the arm 32 has a narrow transverse slot 58, Fig. 1, intersecting a small portion of the hole 33 which forms the journal or bearing for the pin or stud 34. Parallel with the bottom of the slot 58 and on the opposite side of the hole 33 therefrom is a small hole 59. The slot 58 and hole 59 are of appropriate width and diameter respectively to receive generally parallel arm portions 61 and 62 of a U-shaped spring wire clip 60, the arm-connecting or base portion of which may embrace closely an adjacent circular side face of the free end of the extension lever 4. In order to hold the clip in position a short projecting portion 63 of the arm 62 is turned or riveted over as at 63 against the arm 32. The arm 61 of the clip is the spring arm and is made of slightly less diameter than the width of the slot 58 in a direction parallel to the hole 33 so that the arm 61 can swing freely in the slot against the bottom thereof. The free end of the arm 61 extends beyond the slot and forms a suitable handle shown as an open loop 65. As shown clearly at the upper part of Fig. 4 the spring arm 61 of the clip 60 seats in a peripheral groove 66 on the reduced diameter forwardly extending portion of the saddle attaching stud or pin 34. The forward end of the latter may be bullet-nosed or beveled as at 67 so as to act as a cam in moving the spring arm 61 of the clip out of the way as the reduced end of the stud or pin is moved through the opening 33 in the direction requisite to mounting of the saddle on the drive arm.

The depth and surface characteristics of the peripheral groove 66 of the stud or pin 34 may be such that the spring arm positively holds the stud or pin in place on the arm 32 or, alternatively, of such depth that release of the pin from engagement with the spring arm can be accomplished simply by forcing the pin or stud axially out of the hole in the arm. Regardless of how the groove is made, however, the attaching stud or pin may be readily released through the agency of the handle 65 by finger pressure thereon in the proper direction. It should be noted that when it is desired that the saddle and blade assembly pivot in a plane parallel to the surface to be wiped it would be undesirable that the spring arm 61 exert an appreciable amount of braking pressure against the pin or stud 34 at the peripheral groove 66. As the drive arm is moved back and forth over the surface to be wiped the stud or pin 34 is urged by the drag of the wiper blade first against one side of the hole 33 and then against the other side. The position of the spring arm as shown by Fig. 1 prevents such transverse movement of the stud or pin 34 from tending to increase pressure of the spring arm against it; whereas, if the spring arm extended (e. g.) generally parallel to the arm 32 of the lever 4, then during one stroke of the drive arm the stud or pin 34 would have such increased or breaking pressure applied thereto by the spring arm 61 and the pivotal movement of the blade assembly would be less steady.

Referring to the form of saddle shown by Figs. 4, 5 and 6 the construction is the same as previously described except that one end of the saddle forming channel has a pair of upstanding ears or fingers 70 formed for instance from parallel extensions of the material of the web 42. The extensions may be folded over at their ends to increase edge bearing surface. Said ears or fingers 70 extend closely adjacent opposite sides of the arm 32 of the lever 4 in spaced relation to the attaching pin or stud 34 so as to prevent pivoting of the saddle and blade assembly parallel to the surface wiped while not interfering with ready removal or replacement of the saddle assembly with respect to the drive arm.

Referring to the form of saddle shown in Figs. 7 and 8, one end of the web 42 of the saddle is extended at 71 beyond the sides 43 (toward the mounting head) and additionally may be extended laterally of the drive arm at each side to form a T-head with supporting ears 72 and 73. The extension 71 supports an anti-pivoting pin 74 on the saddle body. When the saddle assembly is mounted on the extension lever 4 of the drive arm the pin 74 freely enters an opening 75 in the arm 32 of the extension lever. If the pin 74 is mounted centrally of the extension 71 of the web 42 the blade or blade assembly 6 will project in line with the drive arm assembly as shown by full lines in Fig. 7. Alternatively, if the pin 74 is mounted at one side of the center position anywhere along the T-head afforded by the ears 72, 73 then, when the saddle is mounted on the extension lever, the blade assembly will project at an angle to the drive arm assembly as suggested for example by broken lines at 6x in Fig. 7. It is sometimes desired that the angular relationship of the blade assembly and drive arm be through a considerably less degree than as indicated by the broken line showing but it is seldom desired that a greater angle be used. The angle can always be predetermined in a given installation and the hole for the anti-pivot pin 74 is drilled or formed in the required position on the extension 71 of the saddle body.

Attention is directed to the fact that the quick detachable fastener device constituted by the grooved or necked pin portion 34 and spring clip 60 is interchangeably adapted to serve to connect the different illustrated types of blade mountings or saddles (and others not shown) to the drive arm; and that the same device without change in design or size is also adapted to serve in case of attachment of the mounting or saddle to a supplemental driving or guiding element as exhibited by the tie or guide rod of the parallelograph mechanism of Figs. 10 and 11. The fastener has further universal application in wiper mechanisms as will become apparent from inspection of the illustrative parallelograph mechanism described below.

Referring to Figs. 10 and 11 the parallelograph mechanism is provided to guide the pivotal motion of the blade assembly in various ways, depending upon the relative length of the various parallelograph elements as well known in the art. The guide or tie rod 80 is pivotally secured at one end as on a pivot stud 81 attached to the mounting bracket B and at the opposite end to the arm 54 of the saddle bracket 50. The pin 34a of the T-shaped bracket 50 of Fig. 3 is detachably secured to the free end of the guide rod by a spring clip 60 identical with the clip 60 already described. The forward end 82 of the pivot stud 81 is reduced and peripherally grooved to make it operatively identical with the forward end of the stud or pin 34 for spring engagement with another spring clip 60 carried on the anchored end of the guide or tie rod 80. The pivot stud 81 also constitutes an attaching bolt for securing the mounting bracket B and the driving unit E together on opposite sides of the vehicle body wall C. The distance from the drive shaft 1 to the pivot stud 81 may, as illustrated, be the same as the distance from the pivot stud or pin 34 to the pivot stud or pin 34a of the T-shaped bracket 50 in which event the parallelograph arrangement formed by the drive arm assembly, guide rod and associated parts will result in the blade assembly extending, in each swung position of the drive arm, parallel to a given reference line (e. g. side of windshield). The showing of the parallelograph mechanism illustrates the applicability of the present drive arm mechanism generally to such construction and also the applicability of the readily detachable connecting means afforded by the spring clip 60 etc. thereto. The advantage of the quick detachable connection of guide rod and saddle assembly at 60—34a is apparent from the above description. The guide rod should also be readily attachable and detachable with reference to its pivot stud (at 60, 82) to save time in installation and for servicing or inspection.

A further feature brought out by Figs. 10 and 11 is that the parallelograph mechanism may be readily reversed for adaptation purposes, as for right hand and left hand use, as follows: When the tie rod and saddle arm 54 are disconnected the wiper assembly may then be swung in a plane parallel to the glass through an angle of 180° (see Fig. 2). The pivot stud 82 is interchangeable in position with the attaching screw shown on the opposite side of the drive shaft from the pivot stud (left, Fig. 10), and by mounting the pivot stud in that position and connecting the tie or guide rod thereto and to the reversed saddle (at 34a) the parallelograph mechanism installation becomes, in effect, left hand instead of right hand as viewed in Fig. 10.

Attention is also called to the fact that the threaded length adjustment between the two sections of the tie or guide rod 80 illustrated at 85 does not require a lock nut to preserve the adjustment, yet adjustment can be quickly effected at any time by disconnecting the fastener held parts at 60, 82; turning the disconnected end of the rod the proper amount, and then reconnecting the rod into place on the pivot stud.

While the cantilever spring provided by the multiple leaf and clip assembly, according to Fig. 9, or the assembly constituted by the spring leaves, clip 38 and rivets 40, as in Fig. 4 (clip and leaf securing rivet 39 being omitted in Fig. 4), are preferred forms, such spring need not be a leaf spring in order to serve in light duty equipment. The multiple leaves are used primarily because the particular design shown is for wiping of transparent aircraft surfaces where very high slip stream forces are involved. Frequently, as much as seven pounds pressure of the blade against the glass is required in order to prevent the blade from being lifted off the glass by the air flow thereover.

The operation of the various forms of wiper mechanism shown will be clear from the above description of parts and assembly.

Before installation of the assembly one first makes certain that the snap fastener connection as at 34, 60 has been fully established by seating of the spring arm 61 into the groove of the blade attaching stud or pin 34 and the blade mounting is further inspected to make certain that the blade pivots freely in the saddle and that the blade assembly pivot pin 45 is secured in the saddle as by means of a cotter pin or wire. To install the drive arm the mounting head 2 is first attached to the drive shaft in proper turned position on the splines and secured as already described and the adjusting worm or screw 25 of the assembly is then operated as by means of a screw driver to bring the wiper blade against the glass or surface to be wiped. With the squeegee of the blade positioned against the glass the drive arm assembly is then tested by movement back and forth to make certain that the blade assembly rocks properly in the saddle. Thereafter the desired blade pressure is adjusted by further manipulation of the adjusting worm or screw 25.

I claim:

1. In a wiper drive arm mechanism, a mounting head adapted for connection with a driving member, an arm member pivotally connected to the mounting head for movement toward and away from the surface to be wiped, an arm extension lever pivotally carried on the arm member for movement toward and away from said surface, said lever having a wiper-carrying arm extending remotely of the pivot axis of the lever in a direction away from the mounting head and another arm extending from said pivot axis toward the mounting head, a spring on the arm member arranged to act on the latter arm of the lever in a direction to oppose movement of the wiper carrying arm of the lever away from said surface, and means arranged to adjust and lock the mounting head and arm member in an infinite variety of angularly adjusted positions about the connecting pivot of the head and arm member.

2. In a wiper drive arm mechanism, an arm member of channel form, driving means therefor, means adjustably supporting one end of said member on the driving means for movement of the arm member toward and away from the surface to be wiped, an arm extension lever pivoted intermediately of its ends on the arm member and extending generally in line with the arm member partly within the channel thereof and having an outer end portion extending beyond the channel and adapted for carrying a wiper, and a multiple leaf spring on the arm member within the channel lengthwise thereof and acting on a portion of the lever within the channel in a manner to oppose movement of the wiper carrying arm of the lever away from said surface.

3. In a wiper drive arm mechanism, driving means, an arm member pivotally adjustable on the driving means for movement toward and away from the surface to be wiped, an arm extension lever pivotally carried on the arm member for movement toward and away from said surface and adapted to carry a wiper into contact with said surface, a cantilever spring on the arm member lengthwise thereof and having a free end overlapping and operatively bearing on a portion of the lever in a manner to oppose movement of the wiper carrying arm of the lever away from said surface, and abutment means between the extension lever and arm for limiting pivotal movement of the lever to a distance less than sufficient for said portion of the lever to disengage the cantilever spring.

4. In a wiper mechanism, a drive arm member adapted to move over a surface to be wiped, a blade carrying saddle member, means capable of pivotally connecting the members on an axis transverse to the plane of movement of the arm, one of the members having a lateral extension, and a pin substantially parallel to the pivotal axis offset therefrom and adapted to secure the extension and a superimposed portion of the cooperating member together so that the blade carried by the saddle is fixed at an angle to the arm.

5. An adjustment device for two adjacent pivotally connected drive arm members, comprising circularly arranged teeth concentrically of the pivot and fixed to one of the members and an adjusting screw on the other member in mesh with the teeth and extending transversely of the pivot, spaced parallel portions of said other member having openings of unequal diameter constituting bearings for supporting the screw, and an axle for the screw passing through an axial bore of the screw, said axle having one diameter portion non-turnably fitting said bore of the screw and turnably fitting the smaller of said bearing openings and a larger diameter portion turnably fitting the larger of said bearing openings, and an adjusting head on the axle adjacent the larger diameter portion of the axle, said larger diameter portion of the axle forming a shoulder abutting the adjacent end of the screw as an axial limit stop to maintain the head and screw a fixed distance apart at opposite ends of the larger bearing opening.

6. In a wiper drive arm and guide rod mechanism of the pantograph type, wherein the guide rod comprises telescoping sections threaded together for lengthwise adjustment of the rod, a detachable pivotal support for one end of the rod enabling the adjustment to be effected by disconnecting said end of the rod, turning said end about its axis and then reconnecting said end whereby the sections become locked against relative turning.

7. A wiper drive arm assembly comprising a supporting arm member forming one end of the assembly and adapted for attachment to a drive shaft extending transverse to a surface to be wiped, a wiper arm member forming the other end of the assembly and a connecting arm member pivotally attached to respective end arm members on mutually parallel pivot axes, spring means reacting oppositely against the wiper arm member and connecting arm member to hold them in a normal relative position but enabling the wiper arm member independently to swing away from said surface by stressing the spring means, and means for locking the connecting and supporting arm members in various relatively swung positions about the associated pivot axis.

8. A wiper drive arm mechanism comprising a mounting head member adapted to be secured to an oscillatable drive shaft, an arm member adapted to support a wiper, said members having relatively overlapping joint portions apertured to receive a pivot pin connecting said portions for pivotal relative movement on an axis transverse to that of the drive shaft, an apertured generally circular toothed rack embracing the pivot pin for support and having a mutilated face portion held by the pin against a complementary surface of one of said members to prevent the rack from turning about the pin, and an adjusting worm rotatably mounted on the other of said members in mesh with the rack teeth, said other member having opposed surface portions preventing axial movement of the worm.

COLUMBUS R. SACCHINI.

REFERENCES CITED

The following references are of record in the file of this patent:

UNITED STATES PATENTS

| Number | Name | Date |
|---|---|---|
| 403,310 | Tschumy | May 14, 1889 |
| 942,743 | Prickett | Dec. 7, 1909 |
| 1,077,402 | Ford | Nov. 4, 1913 |
| 1,099,143 | Tracy | June 2, 1914 |
| 1,246,829 | McWhirter | Nov. 13, 1917 |
| 1,371,363 | Gillet | Mar. 15, 1921 |
| 1,416,817 | Greelish | May 23, 1922 |
| 1,504,641 | Mukai | Aug. 12, 1924 |
| 1,695,326 | Folberth et al. | Dec. 18, 1928 |
| 1,730,342 | Anderson | Oct. 8, 1929 |
| 1,887,655 | Marple | Nov. 15, 1932 |
| 2,012,313 | Lark et al. | Aug. 27, 1935 |
| 2,232,757 | Zeder | Feb. 25, 1941 |
| 2,289,552 | Rousseau | July 14, 1942 |
| 2,326,402 | Smulski | Aug. 10, 1943 |